United States Patent
Maiorano Quiroga et al.

(10) Patent No.: US 10,346,419 B1
(45) Date of Patent: Jul. 9, 2019

(54) ON-THE-FLY STRUCTURE CHANGE DATA CONVERSION

(71) Applicant: Workday, Inc., Pleasanton, CA (US)

(72) Inventors: Salvador Maiorano Quiroga, San Ramon, CA (US); Vishal Garg, San Ramon, CA (US); Zhenpeng Li, San Ramon, CA (US)

(73) Assignee: Workday, Inc., Pleasanton, CA (US)

( * ) Notice: Subject to any disclaimer, the term of this patent is extended or adjusted under 35 U.S.C. 154(b) by 257 days.

(21) Appl. No.: 14/823,597

(22) Filed: Aug. 11, 2015

(51) Int. Cl.
  *G06F 16/00* (2019.01)
  *G06F 16/25* (2019.01)
  *G06F 16/23* (2019.01)

(52) U.S. Cl.
  CPC ........ *G06F 16/254* (2019.01); *G06F 16/2379* (2019.01)

(58) Field of Classification Search
  CPC combination set(s) only.
  See application file for complete search history.

(56) References Cited

U.S. PATENT DOCUMENTS

| | | | |
|---|---|---|---|
| 2004/0220982 A1* | 11/2004 | Probert, Jr. | G06F 17/30569 |
| 2007/0100897 A1* | 5/2007 | Kelly | G06F 8/71 |
| 2008/0082589 A1* | 4/2008 | English | G06F 17/30076 |
| 2008/0201538 A1* | 8/2008 | Furuichi | G06F 12/0246 711/154 |
| 2010/0325317 A1* | 12/2010 | Kimelman | G06F 13/28 710/22 |
| 2014/0074894 A1* | 3/2014 | Han | H04N 21/23109 707/803 |

* cited by examiner

*Primary Examiner* — Etienne P Leroux
(74) *Attorney, Agent, or Firm* — Van Pelt, Yi & James LLP (57) ABSTRACT

A system for data conversion comprises an interface and a processor. The interface is to receive a data conversion definition. The processor is to store an indication of data requiring data conversion; launch a data traverser and an on-the-fly converter; and in the event that data requested to be accessed requires data conversion: convert, using the on-the-fly converter, data to a converted data using the data conversion definition and provide the converted data.

13 Claims, 8 Drawing Sheets

ON-THE-FLY STRUCTURE CHANGE DATA CONVERSION

BACKGROUND OF THE INVENTION

A database system stores data using a set of data structures. In enterprise database systems, each data structure may be stored a large number of times for a large company. For example, the employee data structure is stored many times (e.g., one employee data structure per employee), the payroll data structure is stored many times (e.g., one payroll result data structure per paycheck issued), etc. In the event a data structure needs to be modified, all stored instances of the data structure need to be modified. This can take a very long time for a large database, creating a situation where accesses may occur where only a fraction of the data structures have been modified.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for on-the-fly data conversion is disclosed. A system for on-the-fly data conversion comprises an interface to receive a data conversion definition, and a processor to store an indication of data requiring data conversion; and in the event that data requires data conversion, convert data to a converted data using the data conversion definition; and provide the converted data.

In some embodiments, enterprise software systems for customers or tenants are constantly evolving. Evolutions may be due to new customer requirements or re-factoring to make software fixes for critical issues or just software to work more efficiently. Evolutions manifest themselves as updates, patches, bug fixes, newer releases of the software, etc. A new release of the software sometimes requires some structural changes as to how existing customer data is represented, requiring data from a previous release to be converted. Depending upon the size of the tenant, data volumes to be converted can be high. At some point, converting customer data can cause processing times to exceed what is reasonable for the software to be released to the customer. Most businesses are time-bound by real-world business situations (e.g., fiscal period end, pay period close, enrollment period end, etc.), so any downtime caused by a newer release of the software translates to operating cost.

In some embodiments, a common solution is to distribute and parallelize the data conversion work to reduce time. However, distributed computing and parallel computing is difficult for even the most senior programmers. Also, the distributed computing and parallel computing may introduce bugs that can be difficult to find and behavior that can be difficult to understand. Moreover, distributed computing and parallel computing only reduces downtime—it does not eliminate the downtime. Also, for service providers servicing multiple tenants where data conversion needs to run for each tenant, running distributed or parallel mode across all tenants would quickly become unmanageable.

In some embodiments, a system for on-the-fly data conversion eliminates the downtime altogether caused by conversions due to data structure changes. The system provides a conversion definition and a run time framework. The conversion definition allows an application developer to specify the structural change. The run time framework provides a mechanism to convert customer data on-the-fly upon access and also provides a sweeper or data traverser that runs in background to fix the persistence of the customer data. The on-the-fly conversion happens on all the servers servicing user requests, providing a consistent view no matter which server services the request.

In some embodiments, a system for on-the-fly data conversion comprises a data conversion definition that is used by an inline converter and a data traverser for converting data. In some embodiments, a system for on-the-fly data conversion converts data structure data (e.g., from a previous version of a data structure to a new version of a data structure). In some embodiments, a system for on-the-fly data conversion is used by an application developer for updating a data structure that is already in use in a database system. In a large database system, traversing all data to locate and convert old versions of the data structure can take a prohibitively long time (e.g., days). While the data traversal is taking place, some data is converted and some data is not, leading to inconsistencies. The system for on-the-fly data conversion supplements a data traverser for traversing and converting data with an inline converter. When data is read, the inline converter determines whether it is data that requires conversion, and in the event that it is, the inline converter converts it on-the-fly. The converted data is provided to the user requesting the data. In the event the user makes changes to the converted data, the changed converted data is stored, making permanent the conversion. Thus data is updated by the data traverser, slowly traversing the data and converting every instance, and by the inline converter, converting data as it is requested and storing the converted versions only when updates are made. Once the data traverser has traversed the entire data set, all conversions should be made. In some embodiments, the data traverser performs a second traversal for purposes of ensuring that all instances are converted. When the data converter verifies that all instances have been converted, the data conversion definition is removed, and the inline converter is not used until a new data conversion definition (e.g., for a new data conversion) is received.

In some embodiments, the inline on-the-fly converter and the data traverser or sweeper are loaded during a software update process. In some embodiments, a separate set of processes is started for each separate client or tenant data (e.g., data isolated within a software as a service (SAAS) database). In some embodiments, more than one set of processes is started for each client, each associated with a different data conversion.

Figure 1:
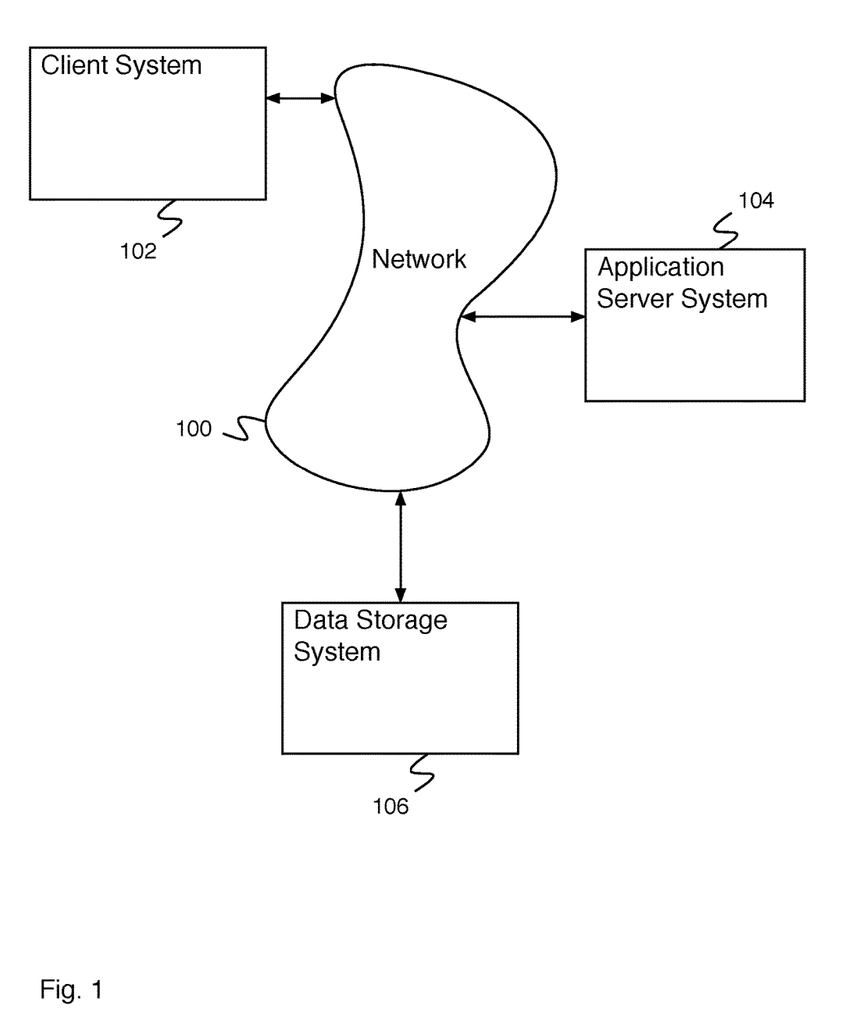
FIG. 1 is a block diagram illustrating an embodiment of a system for on-the-fly data conversion.

FIG. 1 is a block diagram illustrating an embodiment of a system for on-the-fly data conversion. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Client system 102, application server system 104, and data storage system 106, communicate via network 100. In various embodiments, client system 102 comprises a system for accessing application server system 104 or data storage system 106. In some embodiments, application server system 104 comprises a data conversion system for converting data from data storage system 104. In various embodiments, the network system comprises 1, 2, 5, 10, 22, 122, or any other appropriate number of client systems. Data storage system 106 comprises a database system for maintaining a database. In some embodiments, data storage system 106 comprises a human resources database system.

Figure 2:
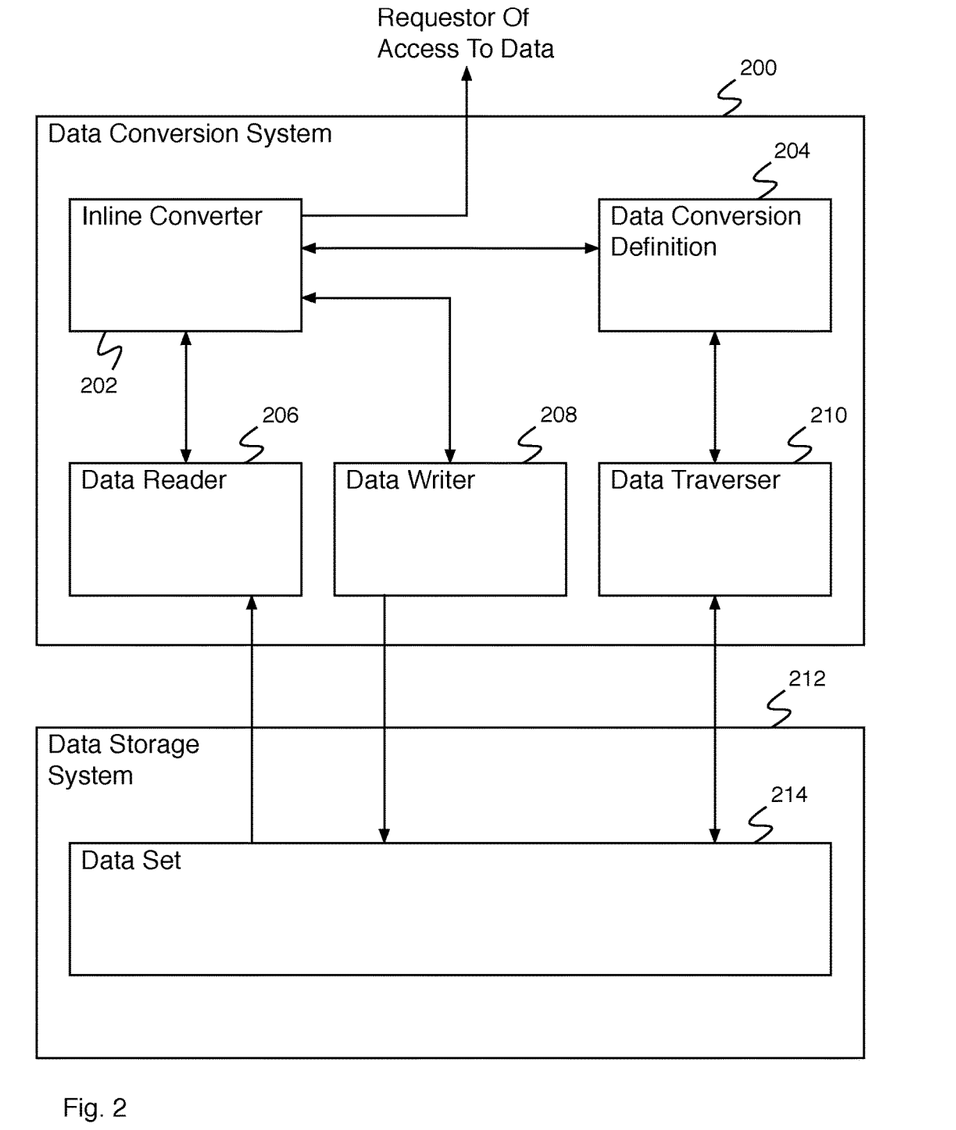
FIG. 2 is a block diagram illustrating an embodiment of a data conversion system.

FIG. 2 is a block diagram illustrating an embodiment of a data conversion system. In some embodiments, data conversion system 200 is implemented by application server system 104 of FIG. 1. In some embodiments, data storage system 212 comprises data storage system 106 of FIG. 1. In the example shown, data conversion system 200 is in communication with data storage system 212. In some embodiments, data conversion system 200 converts data stored by data storage system 212. In some embodiments, data conversion system 200 performs an on-the-fly structure change data conversion. Data conversion system 200 comprises data conversion definition 204. In some embodiments, data conversion definition 204 comprises a definition for converting data. In some embodiments, data conversion definition 204 comprises an input data structure (e.g., a data structure to be converted). In some embodiments, data conversion definition 204 comprises one or more data structure modifications. In some embodiments, data conversion definition 204 comprises a mapping (e.g., a conversion from an input data structure to an output data structure). In some embodiments, data conversion definition 204 comprises a relationship (e.g., a relationship between an input data structure and an output data structure). In some embodiments, data conversion definition 204 is used for on-the-fly data conversion (e.g., data is read, converted using data conversion definition 204 to create a converted data, and the converted data is provided to the user requesting the data). In some embodiments, a definition for converting data is received by data conversion system 200 using an input interface. In some embodiments, data conversion definition 204 comprises an indication of data requiring data conversion. For example, a flag or a metadata indicating data that requires data conversion. In some embodiments, data conversion definition 204 is implemented using a processor. Data conversion system 200 additionally comprises inline converter 202. In some embodiments, inline converter 202 performs on-the-fly data conversion. In some embodiments, inline converter 202 is implemented using a processor. In some embodiments, inline converter 202 receives data from data reader 206. In the example shown, data reader 206 reads data from data set 214 stored on data storage system 212. In some embodiments, data reader 206 is implemented using a processor. In some embodiments, inline converter 202 provides converted data to the requestor of access to the data. In some embodiments, inline converter 202 receives changes to converted data from the requestor of access to the data. In some embodiments, inline converter provides changed converted data to data writer 208 for writing. In some embodiments, data writer 208 is implemented using a processor. Data conversion system 200 additionally comprises data traverser 210. In some embodiments, data traverser 210 traverses a data set (e.g., data set 214). In some embodiments, traversing a data set comprises sequentially accessing data from the data set. In some embodiments, data traverser 210 determines whether data accessed while traversing the data set requires conversion, and in the event that data requires conversion, data traverser 210 converts the data according to data conversion definition 204. In some embodiments, data traverser 210 tracks the progress traversing the data set. In some embodiments, data traverser 210 determines that data set traversal is complete. In some embodiments, data traverser 210 is implemented using a processor. In various embodiments, the elements of data conversion system are implemented using separate processors, all using a single processor, or using multiple processors allocated in any other appropriate way.

Figure 3:
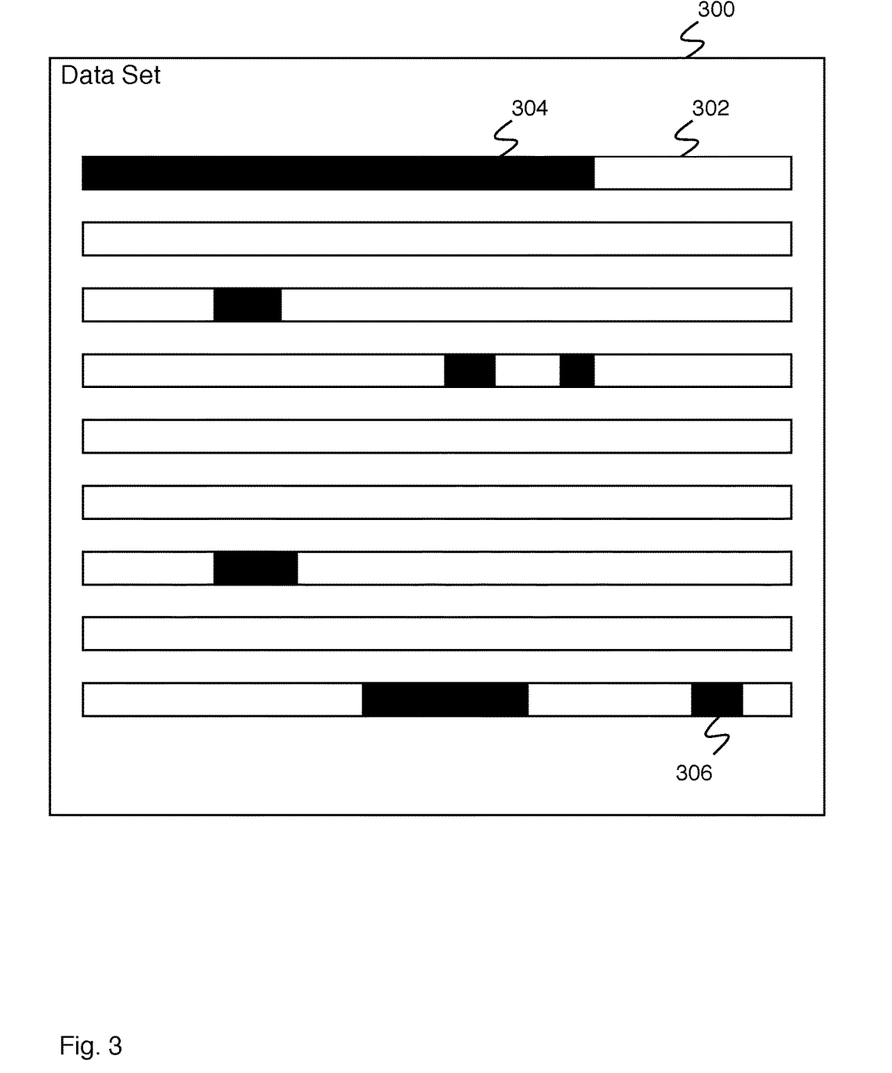
FIG. 3 is a diagram illustrating an embodiment of a data set.

FIG. 3 is a diagram illustrating an embodiment of a data set. In some embodiments, data set 300 comprises data set 214 of FIG. 2. In the example shown, data set 300 comprises a data set during the process of on-the-fly data conversion (e.g., after the process of on-the-fly data conversion is begun but before it is completed). In the example shown, empty segments (e.g., empty segment 302) represent data that has not been converted by the on-the-fly conversion process. Filled segments (e.g., filled segment 304 or filled segment 306) represent segments that have been converted by the on-the-fly conversion process. The on-the-fly conversion process comprises two conversion mechanisms (e.g., traversal and on-the-fly conversion). Filled segment 304 represents data that has been converted by a data traverser (e.g., data traverser 210 of FIG. 2). In some embodiments, the data traverser begins at the beginning of the data set and traverses the data sequentially, converting each data instance in turn. Filled segment 306 represents data that has been converted by an inline converter (e.g., inline converter 202 of FIG. 2). In some embodiments, inline converter converts data as it is requested by a client system, and only stores converted data back to data set 300 in the event it is modified by the client. Thus, data converted by the inline converter and stored comprises a set of data that depends on the usage patterns of the client system, which results in a scattered or random pattern for conversion. In some embodiments, due to the scattered or random pattern, data is tracked to indicate which data has been converted and which data has not (e.g., with a flag for indicating whether the data has been converted).

Figure 4A:
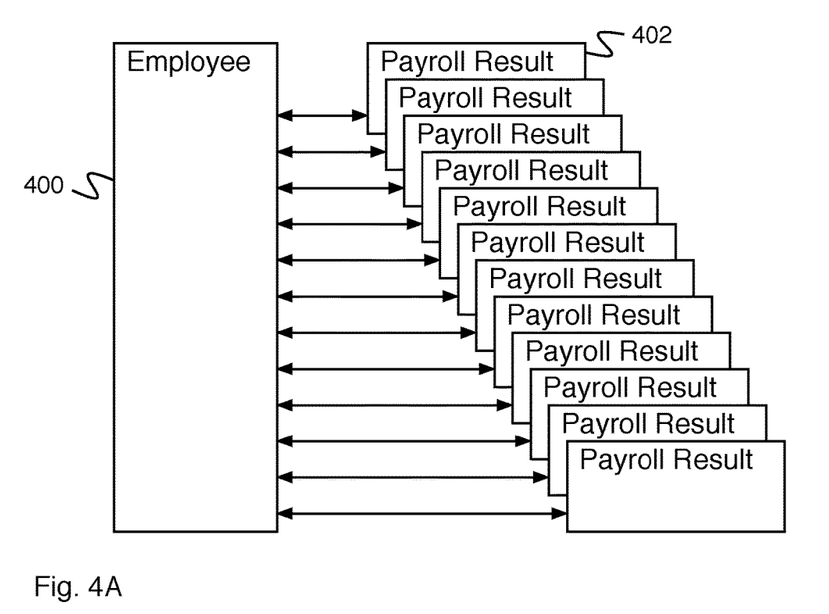
FIG. 4A is a diagram illustrating an employee object before conversion.

FIG. 4A is a diagram illustrating an employee object before conversion. In some embodiments, employee object 400 comprises unconverted parts of a data set (e.g., empty segment 302 in data set 300 of FIG. 3). In the example shown, employee object 400 of FIG. 4A comprises a set of bidirectional links to a set of payroll result objects (e.g., payroll result object 402). From employee object 400 each payroll result associated with it can be accessed. Each payroll result additionally links back to employee object 400, identifying the employee it is associated with. As the employee works and time passes, more and more payroll result objects associated with the employee are created. The employee object keeps a history of all payroll results that are attached to it from the beginning of time, which leads to the object being too large. A large number of connections from the employee object to payroll result objects can dramatically increase the time required to access the employee object, reducing performance of the data storage system.

Figure 4B:
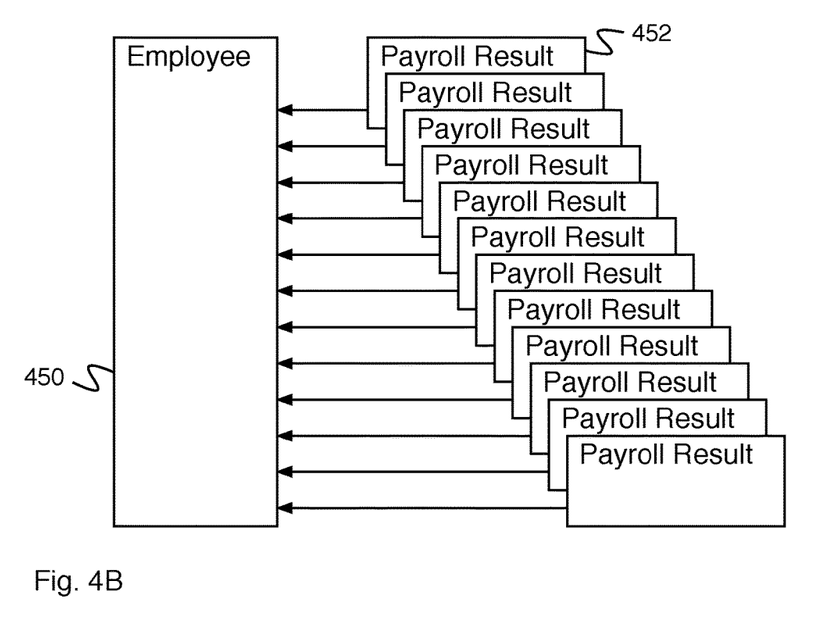
FIG. 4B is a diagram illustrating an employee object after conversion.

FIG. 4B is a diagram illustrating an employee object after conversion. In some embodiments, employee object 450 comprises converted parts of a data set (e.g., filled segment 304 or 306 of data set 300 of FIG. 3). In the example shown, employee object 450 of FIG. 4B comprises an employee object after conversion. Employee object 450 is associated with a large set of payroll result objects (e.g., payroll result object 452). The connections between employee object 450 and the payroll result objects are only from the payroll result objects to employee object 450 and not in the opposite direction. Thus, accessing the employee object is not burdened by the large number of payroll objects. Typically, it is not a necessary function to require access to all payroll result objects from an employee object, so little performance is lost by this change. In the event it is necessary to access all payroll result objects associated with an employee, the set of all payroll result objects can be searched, and all payroll result objects pointing to the employee identified. This process is more time consuming than it would be in the event that employee object 450 pointed to the payroll result objects, but the loss of performance is made up for by the gains in typical accesses to employee object 450. In some embodiments, employee object 450 comprises a single payroll result link (e.g., to the most recent payroll result). In some embodiments, conversion of an object definition (e.g., from employee object 400 of FIG. 4A to employee object 450 of FIG. 4B) is performed using an on-the-fly conversion process.

In some embodiments, a conversion definition is for a specific type of structural change. A structural change can be, for example, of the following types:

Mapping—A mapping conversion definition consists of a set of mappings. Each mapping specifies a mapFromInstance and a mapToInstance. A mapFromInstance for example, is the Name field for Person Class. And mapToInstance is the Name field for PersonV2 Class, where PersonV2 is a re-factored newer version of the Person Class. A mapping conversion definition also specifies an Activation Toggle, that when set as enabled, ACTIVATES the conversion. For example, a new custom report field is mapped to an existing one or a new edit account transaction user task is mapped to an old edit account transaction user task. This happens when an account data model is re-factored and, as part of this transition, existing customer reports running on that account need to replace old report fields with new report fields. Also, some of the existing user transactions need to be replaced by new transactions. A mapping conversion definition can support a set of mappings.

Relationship (2>1)—A Relationship (2>1) conversion definition specifies a relationship definition from Class A to Class B, that was earlier defined as bi-directional (2-way) and is intended to be uni-directional (1-way). For example, Payroll Result Class to Employment Class. A relationship (e.g., payroll result for employment) needs to be changed from 2-way to 1-way. This is important when the size of employment instances (both memory and persistence) needs to be reduced. Over time, an employment instance gets bigger as it holds more and more references to payroll result instances. By changing these payroll result instances to 1-way, the employment instance no longer has to hold references back to payroll result instances, thereby reducing both memory and persistence foot print (e.g., storage requirements, reference requirements, etc.). In addition, the conversion definition also specifies an Activation Toggle, which when set as enabled, ACTIVATES the conversion.

In some embodiments, the conversion definition language guarantees that each conversion is correctly defined. For example, an application developer would see an error message in the event that a mapping is invalid. An example of an invalid mapping includes: a Name field of Person Class is mapped incorrectly to Name field of a Job Class. An example of an invalid Relationship (2>1) includes: the other side of relationship (e.g., a sibling) Employment to Payroll Result is being used in logic elsewhere or the just does not exist. This avoids common run time application programming errors by catching invalid logic at design time.

In some embodiments, a conversion life cycle has the following characteristics:

Activation—Each conversion specifies a Toggle on its definition. When applying a new patch release, conversion run time evaluates the toggle for each conversion prior to loading a tenant. Unless the conversion is already marked as COMPLETE, the conversion is ACTIVATED in the event that the toggle is enabled. A patch release is generally applied weekly and may or may not contain more conversion definitions.

Finalization—When all customer data for a given structure change conversion is persisted (e.g., a completion of all conversions indicated), the conversion is marked as COMPLETE. For conversion run time on the subsequent patch, post loading of the tenant the conversion is marked as FINALIZED. Conversion on subsequent releases is then marked SKIPPED from activating forever and is considered end-of-life'd (e.g., this process is marked as completed and terminated).

In some embodiments, a data conversion system (e.g., data conversion system 200 of FIG. 2) comprises a conversion manager that determines the conversions to run (e.g., the conversions activated) and manages execution of the conversions. The conversion manager creates the following:

Conversion "runtime" or inline converter for each conversion—Interprets the conversion definition, helps build the Tenant Transformers and manages the state of conversion.

Transformer loader helper or data reader—Upon instance load (e.g., either for the data traverser process—lazy, or for the immediate viewing process—eager), helps apply chain of transforms to the instance in memory.

Data traverser—Runs through all the instances of affected classes and applies chain of transforms and persists the instance.

In some embodiments, a conversion runtime performs the following:

Interprets the conversion definition for structure changes.

Adds its structure changes to help build a tenant transformer prior to tenant loading.

Tracks the state of the conversion, whether the data traverser had finished processing all the classes and instances for this conversion, to mark itself COMPLETE.

In some embodiments, a conversion runtime performs the following:

All structure changes for conversions of same type are collated (collected and combined) to build a transformer.

A transformer maintains a map of structure changes (old->new) and also all the classes affected by these structure changes Transformers are then organized by affected class. So each class has a chain of transformers.

Maintains the logic of how to apply the transform for a specific type of structure change (2>1 or Mapping).

In some embodiments, a transformer loader helper performs the following:

When loading (lazy or eager) the instance, the instance loader checks whether its class has a chain of transformers, and asks the transform loader helper to run the instance through a chain of transforms. Helper in-turn, asks each transformer to apply its transform.

In some embodiments, a data traverser performs the following:

Scans through all the affected classes (sorted) for all the transformers for a tenant.

For each instance of the affected class, applies the transform.

In the event that the instance is transformed, persists the instance.

Notifies the conversion runtime about its state (e.g., current class and last instance currently processed).

Both scan and persist operations are executed on a batch on instance(s). The batch size is regulated by the conversion manager runtime, depending upon the time it takes to transform or persist a specific batch.

In some embodiments, a conversion execution scenario is as follows:

The old class Account Class has been re-factored to be a new class Account V2 Class. All instances of Account Class have already been moved to Account V2 class. There is a requirement to convert existing Edit Account Transaction task that the customers have in their Favorites and To Do's to transparently switch to Edit Account V2 Transaction. Application Developer has created a new conversion to map the old task—Edit Account Transaction to the new task—Edit Account Transaction V2 and has toggled the conversion to ON.

Given the scenario above, the conversion execution sequence is as follows:

1. The Conversion Manager creates a Conversion Runtime. And, upon Tenant Prior Load, checks whether the conversion is activated (e.g., is Toggled ON, but has NOT Completed), registers the Conversion Runtime and fires REGISTER event to the Conversion Run time.

2. Conversion Runtime creates a Mapping Transformer that holds the map (e.g., Edit Account Transaction Task->Edit Account V2 Transaction Task) and the affected Classes (e.g., Favorite and To Do).

3. Conversion Runtime registers Mapping Transformer for each of the affected Classes (e.g., To Do and Favorites) and creates a Transformer Helper for Instance Loader.

4. When the Tenant Instance Loader loads a To Do or Favorite Instance in Memory. It will use the Transformer Loader Helper. And, when it encounters a reference to Edit Account Transaction Task, Transformer Loader Helper would ask the Mapping Transformer to map it to Edit Account V2 Transaction Task.

5. The data traverser, meanwhile, scans all Instances of To Do and Favorite. Instance Loader uses the same Transformer Loader Helper. And, when loading a To Do and Favorite instance encounters a reference to Edit Account Transaction Task, Helper fixes the Instance to refer to Edit Account V2 Transaction Task using the Mapping Transformer and writes the fixed instance into persistence.

6. When all instance(s) are fixed and persisted, the data traverser tells the Conversion Run time that the conversion is complete. The Conversion Run-time persists its state as COMPLETED. Conversion Manager marks the Conversion as FINALIZED when applying the next patch. No Mapping Transform will be registered thereafter. Therefore, no Transformer Loader Helper is used by the Instance Loader.

In some embodiments, data traverser progress in scanning classes is recorded to a durable store (e.g., a database). Also, the data traverser communicates its progress to each conversion runtime. And, each conversion runtime also records to the durable store. In case the conversion is stopped unexpectedly, the conversion resumes from last recorded progress upon restart.

In some embodiments, at a given moment of time, there can be two transactions modifying the same instance; the data traverser may be updating the same instance that a UI user transaction may have modified. A modified instance should have already applied the transform during its load and therefore nominally it should be skipped by the data traverser. To ensure that data traverser does not update a modified instance, the data traverser reads the transaction of the instance, and only updates the instance in the event that the transaction is unchanged. For example, every instance object stores the last updated transaction (e.g., transaction ID) that modified itself in persistence. The Instance Object stores class, ID, last_updated, and bytes in DB, which are read from last_updated transaction.

Figure 5A:
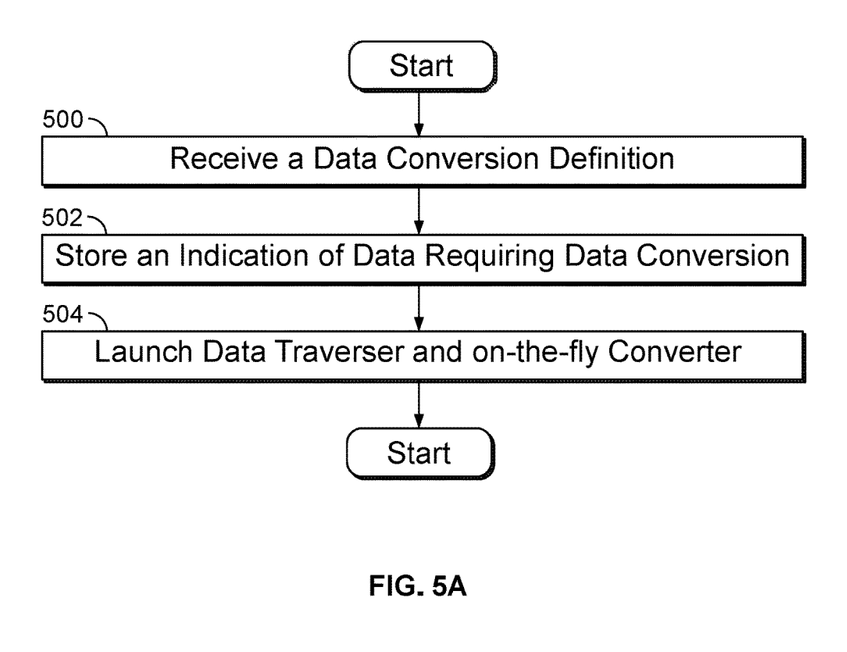
FIG. 5A is a flow diagram illustrating an embodiment of a process for on-the-fly data conversion.

FIG. 5A is a flow diagram illustrating an embodiment of a process for on-the-fly data conversion. In some embodiments, the process of FIG. 5A is implemented by data conversion system 200 of FIG. 2. In the example shown, in 500, a data conversion definition is received. For example, mapping data conversion has—a) pairs of <old instance Id, new instanceId>, and b) toggle Activation—(YES/NO). For another example, 2-way to 1-way data conversion has—a) the relationship to be converted (Employee to Payroll Result), and b) toggle Activation (YES/NO). In 502, an indication of data requiring data conversion is stored. For example, the class(es) that require conversion. In some embodiments, tenant(s) are indicated that require the conversion. In some embodiments, a tenant comprises a silo of data and computing system for a specific business entity, where the tenant data for the tenant is always separate from any other tenant's data of another tenant. In some embodiments, an indication of data requiring data conversion comprises an indicator for determining that data requires data conversion. In some embodiments, the indication of data requiring data conversion is determined from the data conversion definition. In 504, a data traverser and an on-the-fly converter are launched. For example, a background process and an immediate access process are started to handle data conversions. The data traverser, as a background or scheduled process, works through all of the designated data that requires the data conversion. The immediate access process converts data, when accessed, to the converted data format for viewing. In the event that it is appropriate, the data is stored in the new converted format and is flagged as having been already converted. In various embodiments, the appropriateness of storing the new converted format is determined based at least in part on whether the data has been changed by the process requesting access, whether the system is set to store any on-the-fly converted data, or under any other appropriate rule for appropriate storing.

Figure 5B:
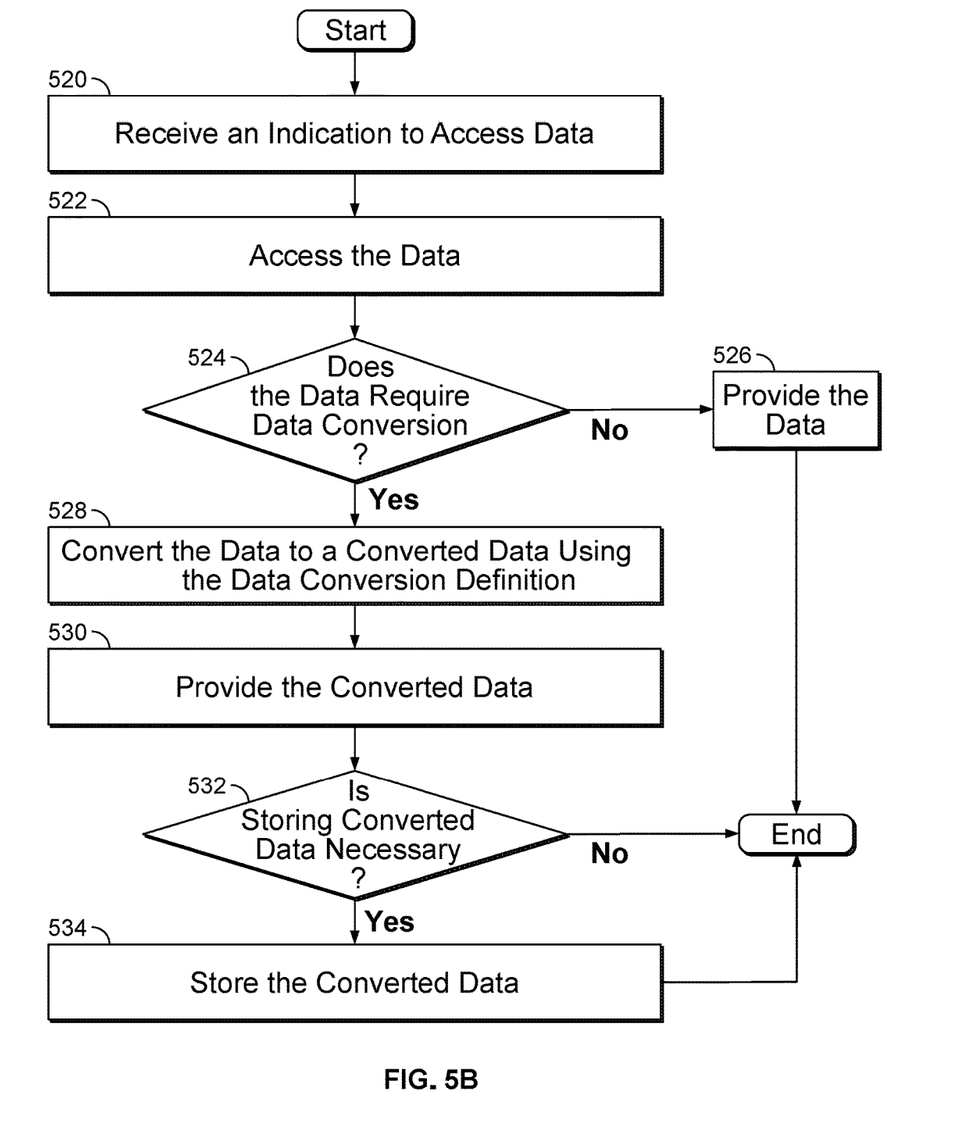
FIG. 5B is a flow diagram illustrating an embodiment of a process for on-the-fly data conversion.

FIG. 5B is a flow diagram illustrating an embodiment of a process for on-the-fly data conversion. In some embodiments, the process of FIG. 5B comprises the process implemented by the on-the-fly data converter of 504 of FIG. 5A. In the example shown, in 520, an indication to access data is received. In some embodiments, an indication to access data comprises a request for data. For example, a user using a client system uses an application that requests access to a data. In 522, the data is accessed. For example, the application requests access to the data. In 524, it is determined whether the data requires data conversion. In some embodiments, it is determined whether the data requires data conversion based at least in part on the data and on the indication of data requiring data conversion (e.g., a toggle switch, a flag, etc.). In the event it is determined that the data requires data conversion, control passes to 528. In the event it is determined that the data does not require data conversion, control passes to 526. In 526, the data is provided, and the process ends. In 528, the data is converted to a converted data using the data conversion definition. In 530, the converted data is provided (e.g., to a client system). In 532, it is determined whether storing the converted data is necessary. In the event that storing the converted data is not necessary, the process ends. In the event that storing the converted data is necessary, in 534 the converted data is stored, and the process ends. For example, the converted data is stored in the database and it is indicated that the instance has been converted (e.g., the sweeper will be able to detect using a toggle, flag, or other indication that the instance is converted from the old data configuration to the new configuration as specified by the data conversion definition.

In some embodiments, it is necessary to store the converted data in the event that modifications to the converted data are received (e.g., from the client system). In some embodiments, instructions for the steps of the process of FIG. 5A or 5B are stored in a memory and provided for execution by a processor coupled to the memory. In various embodiments, the memory comprises a magnetic memory, a solid-state memory, an optical memory, or any other appropriate memory.

Figure 6:
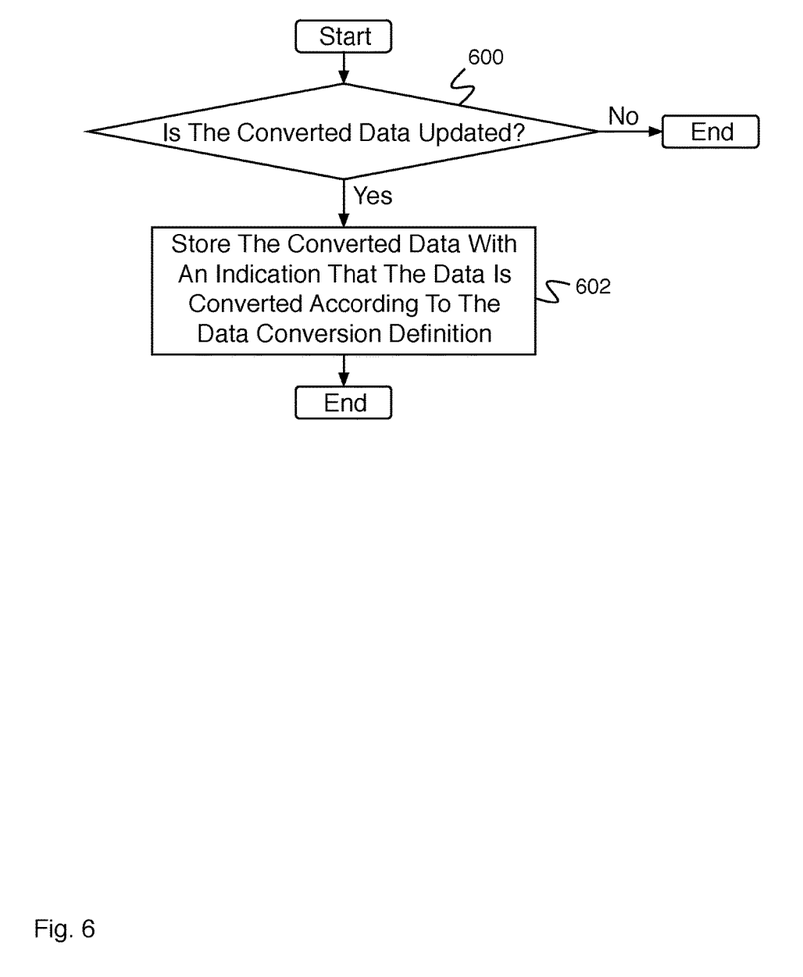
FIG. 6 is a flow diagram illustrating an embodiment of a process for storing converted data, in the event that it is necessary.

FIG. 6 is a flow diagram illustrating an embodiment of a process for storing converted data, in the event that it is necessary. In some embodiments, the process of FIG. 6 implements 532 and 534 of FIG. 5B. In the example shown, in 600, it is determined whether the converted data is updated. In the event it is determined that the converted data is not updated, the process ends. In the event it is determined that the converted data is updated, control passes to 602. In 602, the converted data is stored with an indication that the data is converted according to the data conversion definition.

Figure 7:
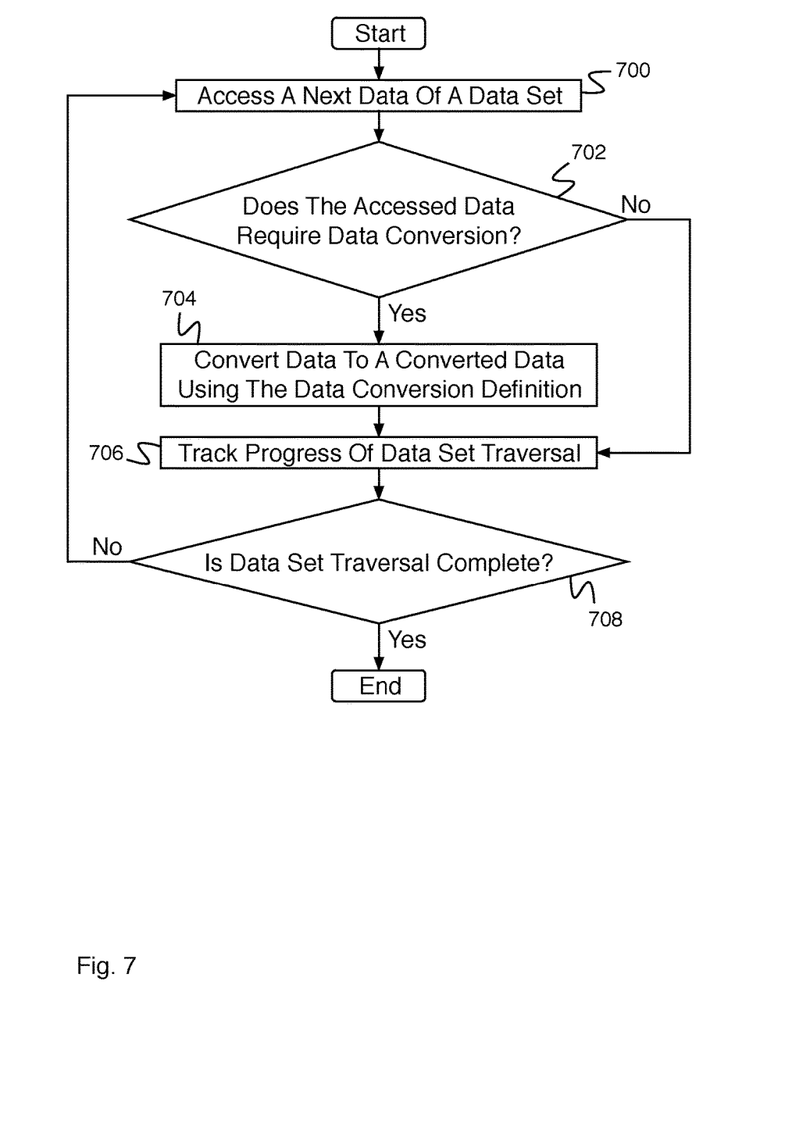
FIG. 7 is a flow diagram illustrating an embodiment of a process for traversing a data set.

FIG. 7 is a flow diagram illustrating an embodiment of a process for traversing a data set. In some embodiments, the process of FIG. 7 is executed by data traverser 210 of FIG. 2. In the example shown, in 700, a next data of a data set is accessed. In some embodiments, the next data comprises the first data. In some embodiments, repeatedly accessing the next data of a data set comprises traversing the data set. In 702, it is determined whether the accessed data requires data conversion. In the event it is determined that the accessed data does not require data conversion, control passes to 706. In the event it is determined that the accessed data requires data conversion, control passes to 704. In 704, the data is converted to a converted data using the data conversion definition. In 706, the progress of the data set traversal is tracked. In some embodiments, tracking the progress of the data set traversal comprises determining the fraction of the data set that has been traversed (e.g., accessed). In 708, it is determined whether data set traversal is complete (e.g., whether it was determined in 706 that the entire data set has been traversed). In the event it is determined that data set traversal is not complete, control passes to 700. In the event it is determined that data set traversal is complete, the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for data conversion, comprising:
  a processor; and
  a memory coupled with the processor, wherein the memory is configured to provide the processor with instructions which when executed cause the processor to:
    receive a data conversion definition;
    store an indication of data requiring data conversion;
    launch a data traverser and an on-the-fly converter, wherein the data traverser is configured to:
      traverse a data set as a background process, wherein each piece of data of the data set is traversed sequentially to be converted;
      determine whether a traverse data accessed while traversing the data set requires conversion; and
      in response to a determination that the traverse data requires conversion:
        convert the traverse data to a converted traverse data using the data conversion definition; and
        toggle the indication to indicate that the traverse data has been converted; and
      in response to a determination that data requested to be accessed requires data conversion:

convert, using the on-the-fly converter, the data requested to be accessed to a converted data using the data conversion definition, wherein the converting of the data requested to be accessed is performed by an immediate access process, the immediate access process being different from the background process; and wherein the converting of the data requested to be accessed comprises to:
   determine whether the data requested to be accessed requires conversion based on the indication, comprising to:
      determine whether the indication indicates that the data requested to be accessed requires conversion; and
      in response to a determination that the indication indicates that the data has been converted, determine that the indication indicates that the data requested to be accessed does not require conversion; and
   in response to a determination that the data requested to be accessed does not require conversion:
      omit converting the data requested to be accessed to the converted data using the data conversion definition; and
      omit toggling the indication to indicate that the data requested to be accessed has been converted; and
   provide the converted data.

2. The system of claim 1, wherein the data conversion definition comprises a mapping.

3. The system of claim 1, wherein the data conversion definition comprises a relationship.

4. The system of claim 1, wherein the date requested to be accessed is from an application.

5. The system of claim 1, wherein the receiving of the data conversion definition comprises to receive a request to access the data.

6. The system of claim 1, wherein the processor is further configured to provide the data in response to a determination that the data does not require data conversion.

7. The system of claim 1, wherein the processor is further configured to:
   determine whether storing the converted data is necessary; and
   in response to a determination that storing the converted data is necessary, store the converted data.

8. The system of claim 7, wherein the converted data is stored with an indication that the data is converted according to the data conversion definition.

9. The system of claim 7, wherein the determining whether storing the converted data is necessary comprises determining whether the converted data is updated.

10. The system of claim 1, wherein the data traverser is configured to track progress traversing and converting the data set.

11. The system of claim 10, wherein the processor is further configured to determine whether the data set traversal is complete.

12. A method for data conversion, comprising:
   receiving, using a processor, a data conversion definition; and
   storing, using the processor, an indication of data requiring data conversion;
   launching, using the processor, a data traverser and an on-the-fly converter, wherein the data traverser is configured to:
      traverse a data set as a background process, wherein each piece of data of the data set is traversed sequentially to be converted;
      determine whether a traverse data accessed while traversing the data set requires conversion; and
      in response to a determination that the traverse data requires conversion:
         convert the traverse data to a converted traverse data using the data conversion definition; and
         toggle the indication to indicate that the traverse data has been converted;
   in response to a determination that data requested to be accessed requires data conversion:
      converting, using the on-the-fly converter, the data requested to be accessed to a converted data using the data conversion definition wherein the converting of the data requested to be accessed is performed by an immediate access process, the immediate access process being different from the background process; and wherein the converting of the data requested to be accessed comprises:
         determining whether the data requested to be accessed requires conversion based on the indication, comprising:
            determining whether the indication indicates that the data requested to be accessed requires conversion; and
            in response to a determination that the indication indicates that the data has been converted, determining that the indication indicates that the data requested to be accessed does not require conversion; and
         in response to a determination that the data requested to be accessed does not require conversion:
            omitting to convert the data requested to be accessed to the converted traverse data using the data conversion definition; and
            omitting to toggle the indication to indicate that the data requested to be accessed has been converted; and
      providing the converted data.

13. A computer program product for on-the-fly data conversion, the computer program product being embodied in a non-transitory computer readable storage medium and comprising computer instructions for:
   receiving, using a processor, a data conversion definition; and
   storing, using the processor, an indication of data requiring data conversion;
   launching, using the processor, a data traverser and an on-the-fly converter, wherein the data traverser is configured to:
      traverse a data set as a background process wherein each piece of data of the data set is traversed sequentially to be converted;
      determine whether a traverse data accessed while traversing the data set requires conversion; and
      in response to a determination that the traverse data requires conversion:
         convert the traverse data to a converted traverse data using the data conversion definition; and
         toggle the indication to indicate that the traverse data has been converted;
   in response to a determination that data requested to be accessed requires data conversion:
      converting, using the on-the-fly converter, the data requested to be accessed to a converted data using the data conversion definition wherein the converting of the data requested to be accessed is performed by an immediate access process, the immediate access process being different from the background process; and wherein the converting of the data requested to be accessed comprises:

determining whether the data requested to be accessed requires conversion based on the indication, comprising:

determining whether the indication indicates that the data requested to be accessed requires conversion; and in response to a determination that the indication indicates that the data has been converted, determining that the indication indicates that the data requested to be accessed does not require conversion; and in response to a determination that the data requested to be accessed does not require conversion:

omitting to convert the data requested to be accessed to the converted data using the data conversion definition; and omitting to toggle the indication to indicate that the data requested to be accessed has been converted; and providing the converted data.

* * * * *